| (12) | United States Patent | (10) Patent No.: | US 8,578,977 B2 |
|---|---|---|---|
| | Moretti et al. | (45) Date of Patent: | Nov. 12, 2013 |

(54) GAS FILLING AND DISPENSING DEVICE, AND FILLING METHOD

(75) Inventors: Alessandro Moretti, Brescia (IT); Philippe Pisot, L'Isle Adam (FR); Maxime Dupont, Grenoble (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 583 days.

(21) Appl. No.: 12/918,665

(22) PCT Filed: Feb. 20, 2009

(86) PCT No.: PCT/FR2009/000188
§ 371 (c)(1),
(2), (4) Date: Aug. 20, 2010

(87) PCT Pub. No.: WO2009/115688
PCT Pub. Date: Sep. 24, 2009

(65) Prior Publication Data
US 2010/0326561 A1    Dec. 30, 2010

(30) Foreign Application Priority Data
Feb. 21, 2008  (FR) ...................................... 08 51105

(51) Int. Cl.
*F17C 13/04*    (2006.01)
(52) U.S. Cl.
USPC ................... 141/197; 141/1; 141/54; 141/59; 141/66; 141/302

(58) Field of Classification Search
USPC .................. 141/1, 4, 54, 59, 65, 66, 94, 197, 141/290–294, 301–302
See application file for complete search history.

(56) References Cited

U.S. PATENT DOCUMENTS 4,124,228 A * 11/1978 Morrison ......................... 285/1
5,018,552 A   5/1991 Politi et al.
(Continued)

FOREIGN PATENT DOCUMENTS

| DE | 4 334 182 | 4/1995 |
| EP | 1 855 048 | 11/2001 |
| EP | 1 316 755 | 6/2003 |

OTHER PUBLICATIONS

International Search Report for PCT/FR2009/000188, mailed Aug. 14, 2009.

*Primary Examiner* — Gregory Huson
*Assistant Examiner* — Nicolas A Arnett
(74) *Attorney, Agent, or Firm* — Allen E. White; Christopher J. Cronin

(57) ABSTRACT

The invention relates to a gas filling and dispensing device that includes a body to be provided in the opening of a pressurized gas storage tank, a gas tapping circuit extending between a first upstream end to be connected to the inside of the tank and a second downstream end to be connected to a gas user, a filling duct having a first upstream end to be connected to the inside of the tank and a second downstream end to be connected to a filling member, said filling duct including at least one portion distinct from the tapping circuit, and the filling duct including a first valve, characterized in that the filling duct includes a second isolation valve arranged in series with the first valve.

8 Claims, 1 Drawing Sheet

(56) References Cited

U.S. PATENT DOCUMENTS

| | | | |
|---|---|---|---|
| 5,538,051 A | * | 7/1996 | Brown et al. .................... 141/18 |
| 5,694,985 A | * | 12/1997 | Diggins ............................ 141/4 |
| 6,257,000 B1 | | 7/2001 | Wang |
| 6,439,278 B1 | * | 8/2002 | Krasnov ........................ 141/197 |
| 2002/0129867 A1 | * | 9/2002 | Krasnov .......................... 141/11 |
| 2003/0102051 A1 | * | 6/2003 | Hasaka et al. ................. 141/325 |
| 2004/0000338 A1 | | 1/2004 | Heiderman |
| 2004/0000339 A1 | * | 1/2004 | Heiderman ................... 137/494 |
| 2008/0105310 A1 | * | 5/2008 | Ogami et al. ................. 137/557 |

\* cited by examiner

GAS FILLING AND DISPENSING DEVICE, AND FILLING METHOD

CROSS-REFERENCE TO RELATED APPLICATIONS

This application is a §371 of International PCT Application PCT/FR2009/000188, filed Feb. 20, 2009, which claims foreign priority under §119(a) to French application 0851105, filed Feb. 21, 2008.

BACKGROUND

1. Field of the Invention

The present invention relates to a gas filling and dispensing device and to a filling method.

The invention relates more particularly to a gas filling and dispensing device comprising a body to be placed in the opening of a pressurized gas storage container, a gas withdrawal circuit extending between an upstream first end intended to be connected to the inside of the container and a downstream second end intended to be connected to a gas user, a filling duct having an upstream first end intended to be connected to the inside of the container and a downstream second end intended to be connected to a filling member, the filling duct including at least one portion separate from the withdrawal circuit, said filling duct including a first valve.

2. Related Art

To fill gas cylinders to high pressure (especially in applications for supplying a gaseous fuel such as hydrogen), it is possible to use quick-fit connection systems for coupling a filling connector (that delivers pressurized gas to the cylinder) to the filling port of a tap (or the like) mounted in the opening of the cylinder. To do this, at the start of the operation, the filling connector is firstly coupled before being pressurized (that is to say it does not deliver gas before it is connected to the filling port).

The filling valve is preferably (without this being limiting) a nonreturn valve which closes automatically and opens under the action of the gas delivered via the filling connector.

In the event of the filling valve failing or sealing imperfectly, there is a risk of the pressure rising in the connection chamber of the filling port.

This abnormally high pressure may damage the filling port, the filling connector which is connected thereto (extrusion of the seals and loss of sealing) and also the withdrawal connector when withdrawal and filling operations are carried out via a common port (a single connection).

To solve this problem, safety valves (pressure-relief devices or PRDs) are used. However, in certain applications (in particular for dangerous or inflammable gases), these safety valves risk releasing into the atmosphere dangerous amounts of gas (clouds or uncontrolled flames).

Another solution consists in completely decoupling the filling circuit from the withdrawal circuit so as to prevent the high gas pressure of the defective filling circuit from reaching the withdrawal circuit. This does not completely solve the problem of the risk of the pressure rising in the filling port and means that the possibility of having common and coincident filling and withdrawal ports is lost.

SUMMARY OF THE INVENTION

One object of the present invention is to alleviate all or some of the abovementioned drawbacks of the prior art.

For this purpose, the device according to the invention, and moreover in accordance with the generic definition given thereto in the above preamble, is essentially characterized in that the filling duct includes an isolating second valve placed in series with the first valve.

Moreover, the embodiments of the invention may have one or more of the following features:

- the first valve is a nonreturn valve that closes automatically;
- the isolating second valve is placed downstream of the first valve;
- the isolating second valve includes an operating member that can be actuated manually in order to open and close said second valve;
- the isolating second valve includes a seat and a movable obturator capable of cooperating with the seat when the valve closes or opens in order to interrupt or allow, respectively, the flow of gas into the filling duct, the manually actuatable operating member comprising a part fastened to the movable obturator and able to move relative to the body of the device, for example by screwing/unscrewing;
- the obturator can move translationally and the filling duct is connected to the isolating second valve via a channel and a chamber, said channel being preferably approximately transverse to the translation direction of the movable obturator;
- the first valve includes a movable obturator urged downwardly by a return member toward a seat for automatically closing the filling duct, said first valve and the return member being placed and designed to permit said first valve to open under the action of a stream of filling gas having a pressure above a predetermined threshold;
- the withdrawal circuit and the filling duct have common or separate upstream ends and common or separate downstream ends;
- the withdrawal circuit includes at least one isolating valve and a pressure regulator; and
- the gas flow cross-section of the isolating second valve is greater than the gas flow cross-section of the nonreturn first valve.

Another object is to propose a method of filling a pressurized gas container provided with a filling and dispensing device according to any one of the above features or the following ones.

According to one advantageous feature, the filling method includes a step of opening the isolating second valve, a step of opening the nonreturn first valve by delivering gas and, at the end of filling, a step of automatically closing the nonreturn first valve by stopping the delivery of gas, followed by a step of closing the isolating second valve.

The invention may also relate to any alternative device or method comprising any combination of the features given above or below.

BRIEF DESCRIPTION OF THE FIGURES

Other features and advantages will become apparent on reading the following description in conjunction with the figures in which.

DETAILED DESCRIPTION OF THE INVENTION

Figure 1:
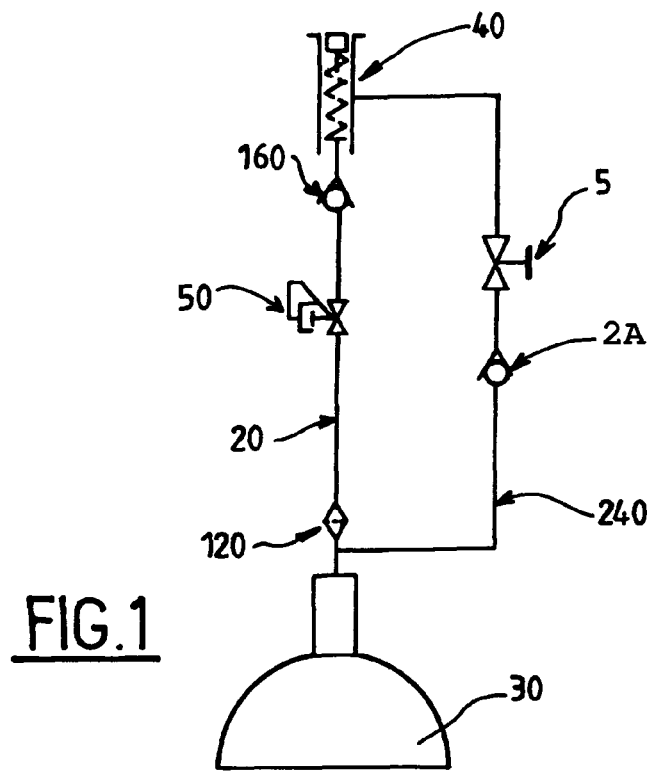
FIG. 1 represents a partial schematic view illustrating the structure and the operation of one possible embodiment of a filling and dispensing device according to the invention.

FIG. 1 illustrates a nonlimiting embodiment of an architecture to which the invention is applicable.

The body of the gas filling and dispensing device is placed in the opening of a pressurized gas storage container 30 and includes a gas withdrawal circuit 20 extending between an upstream first end connected to the inside of the container 30 and a downstream second end intended to be connected to a gas user 40.

For example, the withdrawal circuit 20 includes, placed in series in the direction from the upstream end to the downstream end, a filter 120, a pressure regulator 50, an isolating first valve 160 and optionally a closure second valve (connection 40).

The device also includes a filling duct 240 having an upstream first end connected to the inside of the container 30 and a downstream second end intended to be connected to a filling member. Preferably, and as shown, the downstream ends of the filling duct 240 and of the withdrawal circuit 20 are common (to allow filling and withdrawal via a single connection 40). Of course, the invention is applicable to any other architecture (having separate upstream/downstream ends and/or common circuit portions for both filling and withdrawal).

The filling duct 240 includes a nonreturn first valve 2A in series with an isolating second valve 5, 10.

The isolating second valve 5, 10 is preferably controlled manually, although this is not necessary.

This isolating second valve 5 provides greater sealing and safety. Preferably, the second valve 5 is opened before the filling gas is delivered and is closed after the end of filling (after gas delivery has been stopped).

Figure 2:
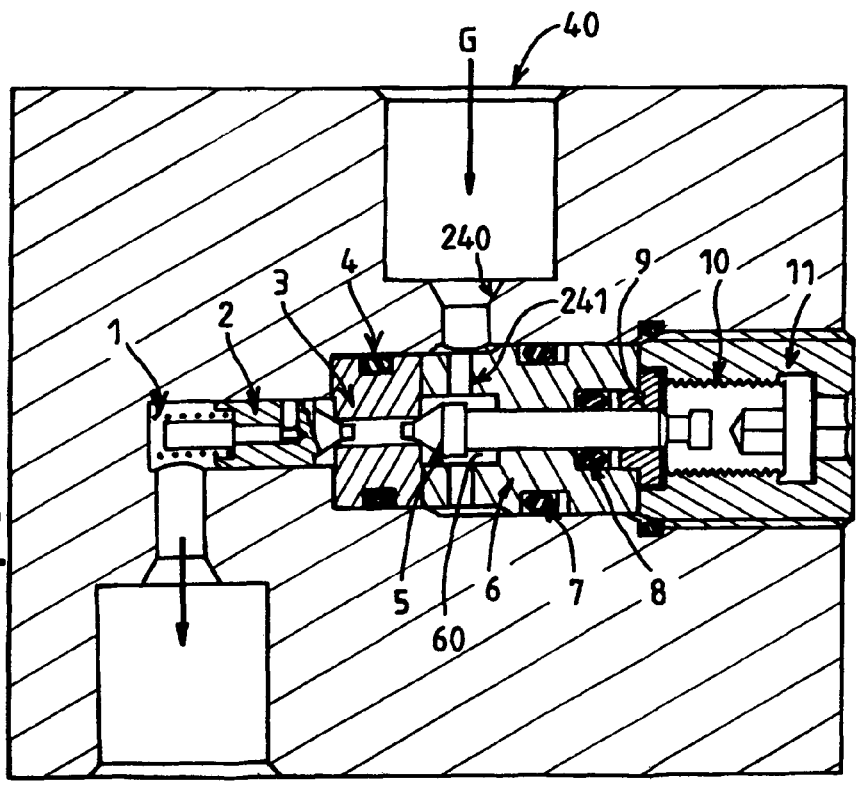
FIG. 2 represents a partial cross-sectional schematic view illustrating the structure and the operation of one possible mechanism example of filling valves for a filling and dispensing device according to the invention.

FIG. 2 illustrates one possible arrangement of the valves of the filling duct 240.

The pressurized gas G arrives from the filling connector and passes through the radial orifices 241 of a support piece 6 and into an internal chamber 60. The support piece 6 is for example cylindrical and sealingly mounted (seal 7 and anti-extrusion ring) in the body of the device. The support piece 6 has a longitudinal bore in which the rod of an obturator, forming the second valve 5, is slidingly mounted. The upstream end of the obturator or second valve 5 (for example in the form of a needle) is housed in the internal chamber 60. The other end of the sliding obturator 5 is fastened to a nut 10, the external surface of which is threaded and cooperates with an internal screw thread of a nut holder 11. As shown, the nut holder 11 may itself be screwed into the body of the device. Sealing between the obturator of the movable second valve 5 and the support piece 6 may be provided by a system comprising a seal 8, an anti-extrusion ring (around the obturator 5) and a shouldered spacer 9.

In this example, the seat of the second valve 5 is formed by the inlet of a central channel of a fixed seat 3 (for example of cylindrical shape) sealingly mounted (by a seal 4) in the body of the device. Upstream of the seat 3 of the second valve 5, the body of the device houses a first valve of the "nonreturn valve" type which includes a spring system 1 urging an obturator 2 (or needle) toward the closure of the upstream end of the central channel of the seat 3 of the second valve 5.

That is to say the member 3 may advantageously form the seat for both the first and second valve obturators 2 and 5. Downstream of the first valve 2, the gas communicates with the inside of the container 30.

To carry out a filling operation, the user may firstly couple the filling connector and then open the second valve 5 by acting manually on the nut 10.

When the second valve 5 is open, the user may order gas to be delivered via the filling connector. The pressurized gas then passes through the central channel of the seat 3 which is open. The gas at a sufficient pressure then pushes the obturator of the first valve 2 off its seat against the action of the spring 1 and then reaches the container.

After filling has been completed and the filling duct is at atmosphere, the spring 1 of the first valve 2 returns and automatically closes the first valve 2 against the seat 3.

The user may insert a dedicated tool into the nut holder 11 compatible with the impression of the nut 10 in order to operate the latter for the purpose of moving the obturator of the second valve 5 into the closed position against the seat 3. This provides double sealing.

The sealing of the second valve 5 is more effective and more reliable because of its mechanical actuation via a nut (or the like) than the sealing of the first valve 2. This is because the first valve 2 may be influenced by external dynamic effects, for example vibration (the opening of the first valve 2 is the result of the dynamic equilibrium between the force of the spring 1 and the opposing force of the filling gas).

In addition, and preferably, when the second valve 5 is in the open position, its flow cross-section for the gas is greater than the flow cross-section created by the first valve 2 in the open position.

Advantageously, the seal between the surface of the seat 3 and that of the second valve 5 is thus less exposed to the flow of high-pressure gas than the first valve 2 and its seat 3.

Of course, the seat(s) 3 may have any other shape (for example a nonsymmetrical shape, unlike in the example shown in FIG. 2).

Likewise, the first valve may have a structure and an operation differing from valves of the "nonreturn" type.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A gas filling and dispensing device comprising a body adapted to be placed in the opening of a pressurized gas storage container, the body comprising:
   a) a gas withdrawal circuit extending between
      i) an upstream first end configured to be capable of connection to the inside of the container and
      ii) a downstream second end configured to be capable of connection to a gas user container,
   b) a filling duct comprising
      i) an upstream first end configured to be capable of connection to the inside of the container and
      ii) a downstream second end configured to be capable of connection to a filling member,
      iii) a first valve comprising
         A) a movable obturator configured to be urged downwardly by a return member toward a seat, the obturator and seat being adapted to automatically close the filling duct,
         B) said first valve adapted to open under the action of a stream of filling gas having a pressure above a predetermined threshold,
      iv) an isolating second valve in series with, and downstream of, the first valve, the isolating second valve comprising,
         A) an operating member configured to be capable of manual actuation and adapted to open and close said second valve in response to manual acuation of the operating member, c) a closure third valve located downstream of the second valve and at the downstream ends of the filling duct and of the withdrawal circuit, wherein the withdrawal circuit and the filling duct have common downstream ends and said filling duct includes at least one portion separate from the withdrawal circuit.

2. The device of claim 1, wherein the isolating second valve further comprises a seat and a movable obturator capable of cooperating with the seat when the valve closes or opens in order to interrupt or allow, respectively, the flow of gas into the filling duct, and wherein the manually actuatable operating member comprises a part fastened to the movable obturator and adapted to move relative to the body of the device.

3. The device of claim 2, wherein the obturator of the isolating second valve is configured to move translationally and wherein the filling duct is connected to the isolating second valve via a channel and a chamber.

4. The device of claim 3 wherein said channel is transverse to the translation direction of the movable obturator.

5. The device of claim 1, wherein the withdrawal circuit includes at least one isolating valve and a pressure regulator.

6. The device of claim 1, wherein the gas flow cross-section of the isolating second valve is greater than the gas flow cross-section of the first valve.

7. The device of claim 1, wherein the closure third valve comprises an obturator configured to be urged by a return member toward a seat in the closed position, said obturator of the third valve being adapted to be moved off the seat to an open position when it is pushed back by contact with an external member of a connection system of a filling and/or withdrawal element.

8. The method of filling a pressurized gas container provided with a gas filling and dispensing device of claim 1, the method comprising the steps of a) opening the isolating second valve,
b) opening the first valve by delivering gas,
c) at the end of filling, automatically closing the first valve by stopping the delivery of gas, and
d) after step c), closing the isolating second valve.

\* \* \* \* \*